(12) United States Patent
Andrieu et al.

(10) Patent No.: US 6,364,916 B2
(45) Date of Patent: *Apr. 2, 2002

(54) METHOD OF MANUFACTURING AN ORGANIC ELECTROLYTE ELECTROCHEMICAL CELL OF UNITARY STRUCTURE

(75) Inventors: Xavier Andrieu, Bretigny S/Oprge; François Boudin, Arpajon, both of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,780

(22) Filed: Feb. 27, 1998

(30) Foreign Application Priority Data

Mar. 3, 1997 (FR) .............................. 97-02494

(51) Int. Cl.$^7$ ............................ H01M 6/22; H01M 2/14
(52) U.S. Cl. ..................... 29/623.3; 29/623.5; 429/145; 429/250
(58) Field of Search .......................... 429/94, 127, 137, 429/142, 144, 145, 162, 249, 250, 254, 304, 306, 308, 309, 316; 29/623.1, 623.2, 623.3, 623.4, 623.5

(56) References Cited

U.S. PATENT DOCUMENTS

| | | | |
|---|---|---|---|
| 3,023,261 A | | 2/1962 | Louis et al. |
| 4,384,047 A | * | 5/1983 | Benzinger et al. ............ 521/64 |
| 4,524,509 A | | 6/1985 | Wegner |
| 4,885,007 A | | 12/1989 | Wegner |
| 5,437,692 A | | 8/1995 | Dasgupta et al. |

(List continued on next page.)

FOREIGN PATENT DOCUMENTS

| | | |
|---|---|---|
| EP | 0 038 885 A1 | 4/1981 |
| EP | 0 243 653 A3 | 11/1987 |
| EP | 0 600 718 A3 | 6/1994 |
| EP | 0 618 629 A1 | 10/1994 |
| EP | 0730316 A1 | 9/1996 |
| EP | 0803925 A1 | 10/1997 |
| EP | 871234 * | 10/1998 |
| WO | WO9515589 | 6/1995 |

OTHER PUBLICATIONS

6001 Chemical Abstracts, 118 Apr. 19, 1993, No. 16, corresponding to JP 4239041.
Patent Abstracts of Japan, vol. 015, No.195 (E–1069) May 20, 1991 corresponding to JP 03 053460 A (Yuasa Battery Co Ltd), Mar. 7, 1991.

(List continued on next page.)

*Primary Examiner*—Gabrielle Brouillette
*Assistant Examiner*—Susy Tsang
(74) *Attorney, Agent, or Firm*—Sughrue Mion, PLLC

(57) ABSTRACT

A method of manufacturing an organic electrolyte electrochemical cell comprising at least one electrochemical couple made up of two electrodes sandwiching a solid film of porous polymer containing the electrolyte, each electrode comprising a porous layer containing an electrochemically active material and a binder, the method comprising the steps of: a polymer is put into solution in a solvent and the solution is spread in the form of a film on a support; the film of solution is immersed in a volatile non-solvent that is miscible with the solvent in order to precipitate the polymer and the polymer film is dried to eliminate the non-solvent; and the couple made up of the polymer film placed between the electrodes and in contact therewith, and impregnated with the electrolyte, is compressed while being heated to a temperature less than or equal to the temperature at which the polymer film starts to melt so as to obtain incomplete melting of the polymer, the electrodes becoming unseparable after cooling.

25 Claims, 2 Drawing Sheets

U.S. PATENT DOCUMENTS

| | | | |
|---|---|---|---|
| 5,503,946 A | | 4/1996 | Fauteux et al. |
| 5,637,421 A | | 6/1997 | Poehler et al. |
| 5,811,205 A | * | 9/1998 | Andrieu et al. ............. 429/137 |
| 5,840,087 A | * | 11/1998 | Gozdz et al. ............. 29/623.3 |
| 6,024,773 A | * | 2/2000 | Inuzuka et al. |

OTHER PUBLICATIONS

Patent Abstracts of Japan, vol. 018, No. 063 (E–1500), Feb. 2, 1994 corresponding to JP 05 283106 A (Nippon Telegraph & Telephone Corp.), Oct. 29, 1993.

Patent Abstracts of Japan, vol. 097, No. 005, May 30, 1997 corresponding to JP 09 022727 A (Toshiba Battery Co Ltd) Jan. 21, 1997.

Patent Abstracts of Japan, vol. 096, No. 011, Nov. 29, 1996 corresponding to JP 08 195220 A (Japan Storage Battery Co Ltd) Jul. 30, 1996.

Patent Abstracts of Japan, vol. 016, No. 540 (P–1450), Nov. 10, 1992 corresponding to JP 04 204522 A (Tonen Corp) Jul. 24, 1992.

* cited by examiner

METHOD OF MANUFACTURING AN ORGANIC ELECTROLYTE ELECTROCHEMICAL CELL OF UNITARY STRUCTURE

The present invention relates to a method of manufacturing an organic electrolyte electrochemical cell of structure that is unitary, i.e. in with the various component elements are connected together so as to form a single whole.

BACKGROUND OF THE INVENTION

Organic electrolyte cells, in particular lithium cells are presently the subject of rapid and major development because of the high energy density they make available and because of their long lifetime. They are particularly suitable for use in objects of small dimensions.

Traditional cells are made up of solid electrodes sandwiching a porous separator containing liquid electrolyte. Because of the risk of leakage, such cells are ill-suited to consumer portable equipment.

As a result cells have been proposed that include an electrolyte that is made solid by being immobilized in a polymer matrix. However, over time electrical contact between the various components of the generator degrades, particularly if gas is given off. In order to limit that phenomenon, the cell is held in a compressed state by a rigid metal container, thereby increasing the weight of the cell. Attempts have therefore been made to interconnect the various components of the generator so that electrical contact between them is guaranteed under all circumstances.

One method of making an electrochemical cell in which the various layers are bonded together is proposed in U.S. Pat. No. 5,540,741. To constitute a first electrode, a paste is deposited on a conductive support, the paste being formed of an electrochemically active material and a polymer solution. After it has dried, the electrode is covered in a layer of a solution of a plasticizer and a copolymer of a vinylidene fluoride and of hexafluoropropylene (VDF-HFP) to form the separator. The resulting assembly is covered in a second electrode constituted by a sheet of lithium made elsewhere. Pressing is performed at a temperature of at least 150° C., causing the copolymer to melt completely and thus leading to a non-porous material. The plasticizer is subsequently extracted by means of a solvent that is inert relative to the polymer. On being used, the cell is impregnated by the electrolyte which occupies the void left between the polymer chains by removal of the plasticizer.

That method suffers from the drawback of giving rise to large changes in dimensions during manufacture of the cell. During extraction, the structure collapses, thus leading to a dense material. Consequently impregnation with the electrolyte takes place slowly. Thereafter impregnation leads to the VDF-HFP copolymer swelling in the presence of the electrolyte solvent. Such changes in dimensions give rise to tightening and unsticking phenomena that are harmful to the electrical continuity of the resulting cell.

OBJECTS AND SUMMARY OF THE INVENTION

An object of the present invention is to provide a method of making an electrochemical cell of unitary structure which minimizes variations in dimensions.

The present invention provides a method of manufacturing an organic electrolyte electrochemical cell comprising at least one electrochemical couple made up of two electrodes sandwiching a solid film of porous polymer containing said electrolyte, each electrode comprising a porous layer containing an electrochemically active material and a binder, the method comprising the following steps:

a polymer is put into solution in a solvent;

said solution is spread in the form of a film on a support;

said film of solution is immersed in a volatile non-solvent that is miscible with said solvent in order to precipitate said polymer;

said polymer film is dried to eliminate said non-solvent; and said couple made up of said polymer film placed between said electrodes and in contact therewith, and impregnated with said electrolyte, is pressed while being heated to a temperature less than or equal to the temperature at which said polymer film starts to melt so as to obtain incomplete melting of said polymer, said electrodes becoming uneeparable after cooling.

The invention presents numerous advantages over known methods. Because the polymer film is impregnated with electrolyte, its porosity is conserved during the sticking step. The mean size of the pores lies in the range 0.1 $\mu$m to 1 $\mu$m. The porous volume is large, constituting 30% to 95% of the volume of the film.

The pressing temperature is selected so that melting of the polymer film remains incomplete and restricted mainly to the surface. The film adheres on the electrodes as soon as the sticking surface has softened sufficiently Consequently, dimensions do not change during sticking, and the porous volume is not significantly altered. In addition, when electrolyte impregnation takes place after sticking, the film is observed to swell, and this is avoided by the method of the invention.

In an implementation of the method of the invention, the support used is an inert support.

The polymer film has good mechanical strength since the polymer itself contains less than 30% of the electrolyte solvent, with the major portion being contained in the pores.

In a first variant, said polymer film and each of said electrodes is impregnated with said electrolyte, and then said polymer film is placed between electrodes and in contact therewith to form said couple.

In a second variant, said polymer film is placed between said electrodes and in contact therewith to form said couple, and said couple is then impregnated with said electrolyte.

In another implementation of the method of the invention, at least one of said electrodes is used as the support as follows:

said solution is spread on the surface of said porous layer of one of said electrodes in the form of a film;

said film is immersed in a volatile non-solvent that is miscible with said solvent;

said film is dried to eliminate said non-solvent;

said electrode including said film is impregnated with said electrolyte;

the film side of said electrode is covered in an electrode impregnated with said electrolyte to form an electrochemical couple; and said couple is pressed while being heated to a temperature less than or equal to the temperature at which said film begins to melt, so as to obtain incomplete melting of said polymer, said electrodes becoming unseparable after cooling.

In yet another implementation of the method of the invention, both of said electrodes are used as the support, as follows:

said solution is spread in the form of a film on the surface of said porous layer of each of said electrodes;

each of said films is immersed in a volatile non-solvent that is miscible with said solvent;

said films are dried to eliminate said non-solvent;

said electrodes including said films are impregnated with said electrolyte;

said electrodes are placed together so that said films are in contact to form an electrochemical couple; and said couple is pressed while being heated to a temperature lower than or equal to the temperature at which said film begins to melt so as to obtain incomplete melting of said polymer, said electrodes becoming uneeparable after cooling.

Using the electrodes as the support for making the polymer film makes it possible to avoid subsequent handling, and thus makes it possible to deposit films that are thinner. The method is thus simplified and made more reliable, and the final product has better performance.

Said polymer is selected from: polyvinylidene fluoride; polyvinyl chloride; polymethylmethacrylate;

cellulose acetate; a polysulfone; a polyether; a polyolefin; and from an alloy of polyvinylidene fluoride with a polymer selected from a polysulfone, polymethylmethacrylate, polyvinylpyrolidone, a copolymer of vinylidene fluoride and ethane tetrafluoride, and a copolymer of vinylacetate and of vinylalcohol.

The preferred one of said polymers is polyvinylidene fluoride (PVDF). PVDF has the advantage of exhibiting very little swelling in the presence of solvent, thus limiting dimensional changes during the manufacture of the electrochemical cell.

Said solvent is an organic solvent selected from: cyclohexanone; dichloromethane; dimethylacetamide (DMA); dimethylformamide (DMF); hexamethylphosphoramide (RMPA); dimethylaulfoxide (DMSO); triethylphosphate (TEP); N-methylpyrolidone (NMP); and mixtures thereof. It is desirable for the interaction between the polymer and the solvent to be weak.

It is preferable to use an organic solvent in which the polymer dissolves without difficulty and which can easily be eliminated by heating to a moderate temperature without running any risk of damaging the active material.

The selected polymer is put into a concentrated solution in the solvent. The concentration of the polymer must not be too high since that is one of the parameters which determines the porosity of the film; it is preferable for the solution to contain at least 50k, solvent.

The polymer in solution is deposited on the surface of the support by any known method such as immersion, coating, spraying, etc . . . . If the surface presents irregularities and a certain amount of pores, they are smoothed over by the solution and they facilitate bonding of the film.

In a first variant, the surface of said porous layer is impregnated with a wetting agent before it is covered in said film. The wetting agent may be a volatile organic solvent, for example.

In a second variant, said solution of a polymer in a solvent also contains a wetting agent at a concentration of less than 10% by weight of said polymer. The agent serves to improve penetration and distribution of the electrolyte in the polymer film.

In a third variant, said solution of a polymer in a solvent also includes a small quantity of a non-solvent, said quantity being insufficient to cause the polymer to be precipitated. The presence of a small quantity of a weak non-solvent facilitates three-dimensional organization of the polymer while it is being precipitated.

The term "non-solvent" is used to designate a liquid in which the polymer is not soluble (a "strong" non-solvent) or is soluble to a small extent only (a "weak" non-solvent) at the operating temperature. When the selected non-solvent is water, either pure or in a mixture, said temperature lies in the range 5° C. to 80° C.

Said non-solvent is selected from: water, ethanol, ethylene-glycol, glycerol, acetone, proplyene carbonate, dichlorotnethane, ethyl acetate, butanol, pentanol, acetonitril, and mixtures thereof. If the selected non-solvent is water, the method of the invention has the advantage of not polluting the environment and of facilitating solvent recycling.

The film is put into contact with the non-solvent. The solvent is then replaced by the non-solvent with which it is miscible, thereby causing the polymer to be precipitated. Subsequent recovery of the solvent extracted by the non-solvent is thus facilitated. A porous film of solid polymer then covers the surface of the electrode. It suffices to evaporate off the non-solvent and possibly a portion of residual solvent by moderate heating.

Said electrolyte comprises a lithium salt dissolved in an organic solvent. The organic solvent comprises a mixture of ethers and/or esters, the esters being selected from linear carbonates, and cyclic carbonates having more than four carbon atoms, such as propylene, ethylene, butylene, diethyl, and dimethyl carbonates, and mixtures thereof, for example.

The lithium salt is selected from: lithium perchlorate $LiCIO_4$, lithium hexafluoroareenate $LiAsF_6$, lithium hexafluorophosphate $LiPF_6$, lithium tetrafluoroborate $LiBF_4$, lithium trifluoromethanesulfonate $LiCF_3SO_3$, lithium trifluoromethanesulfonimide $LiN(CF_3SO_2)_2$ (LiTFSI), and lithium trifluoromethanesulfonmethide $LiC(CF_3SO_2)_3$.

When the polymer is PVDF, heating is preferably performed at a temperature lying in the range 90° C. to 100° C. The coagulated polymer film is entirely stable up to a temperature of 75° C. and it melts above 105° C. Melting does not take place at a precise temperature, but spreads over a temperature range It starts at the beginning of the range and does not become complete until the end thereof. It is therefore preferable to operate immediately before or at the beginning of the range. It is also known that PVDP in the raw state melts at above 150° C.

Pressing is preferably performed at a pressure lying in the range $9.81 N/cm^2$ to $98.1 N/cm^2$.

The present invention also provides an electrochemical cell made by the method of the invention, including an anode in which said electrochemically active material is a carbon-containing material suitable for inserting lithium in its structure and selected from graphite, coke, vitreous carbon, carbon black, and active carbon, and said polymer is polyvinylidene fluoride.

The present invention also provides an electrochemical cell made by the method of the invention, including a cathode in which said electrochemically active material is an oxide of a transition metal selected from vanadium oxide, lithium-containing oxides of manganese, nickel, and cobalt, and mixtures thereof, and said polymer is polyvinylidene fluoride.

BRIEF DESCRIPTION OF THE DRAWINGS

Other characteristics and advantages of the present invention appear from the following implementations that are naturally given by way of illustrative and non-limiting example, and from the accompanying drawings, in which.

MORE DETAILED DESCRIPTION

EXAMPLE 1

Figure 1:
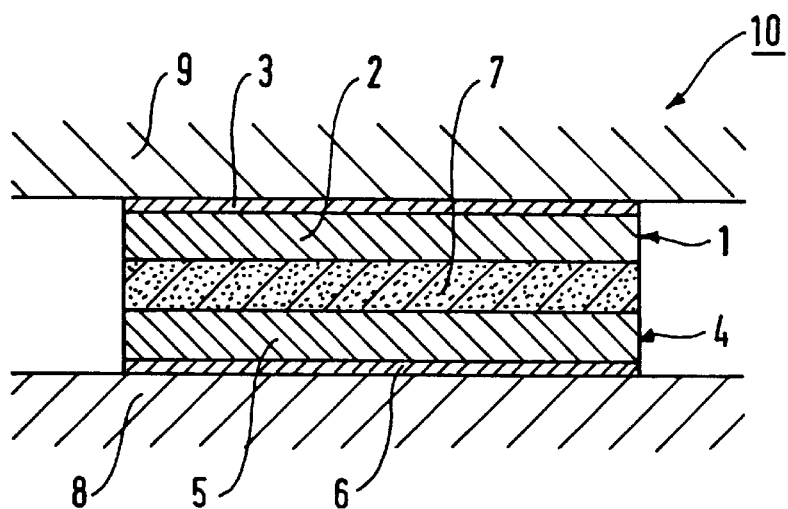
FIG. 1 is a diagrammatic section view of a button type cell made by the method of the invention.

The method of the invention was used to make a button type lithium rechargeable electrochemical cell A as shown in FIG. 1.

The anode 1 was made of a porous layer 2 deposited on a copper collector 3. The porous layer 2 contained graphite as its electrochemically active material, and a binder which was polyvinylidene fluoride (PVDF).

The cathode 4 was made up of a porous layer 5 deposited on an aluminum collector 6. The porous layer 5 contained a mixed nickel and lithium oxide as its electrochemically active material and a binder constituted by polyvinylidene fluoride (PVDP).

A polymer solution was prepared containing 15% by weight of PVDF, 60% by weight of triethylphosphate (TEP) as solvent, and 25% by weight of tetrahydrofuran (THF) which acts as a diluant to adjust the viscosity of the solution. The solution was spread in the form of a film on an inert support, e.g. an aluminum sheet, a plate of glass or of PTFE, etc. . . . .

The THF was evaporated off in order to trigger three-dimensional organization of the polymer chains and facilitate precipitation of the polymer The film was immersed in a non-solvent which was water, thereby causing the polymer to precipitate. A porous PVDF membrane 7 was thus obtained which was dried in air and which is suitable in that state for being conserved until it is used.

When the cell was assembled, the porous membrane 7 and the electrodes 1, 4 were dried under a vacuum respectively at 60° C. and 120° C. and then impregnated with electrolyte. The electrolyte was made up of a solvent constituted by an equal-weight mixture of propylene carbonate (PC) and ethylene carbonate (EC), in which lithium hexafluoroarsenate LiAisF$_6$ was dissolved.

The cathode 4, the membrane 7, and the anode 1 were superposed in that order and maintained under pressure at a temperature of 95° C. for 10 seconds. The resulting assembly was placed in a cup a closed by a cover 9 to form a button type cell 10.

Figure 2:
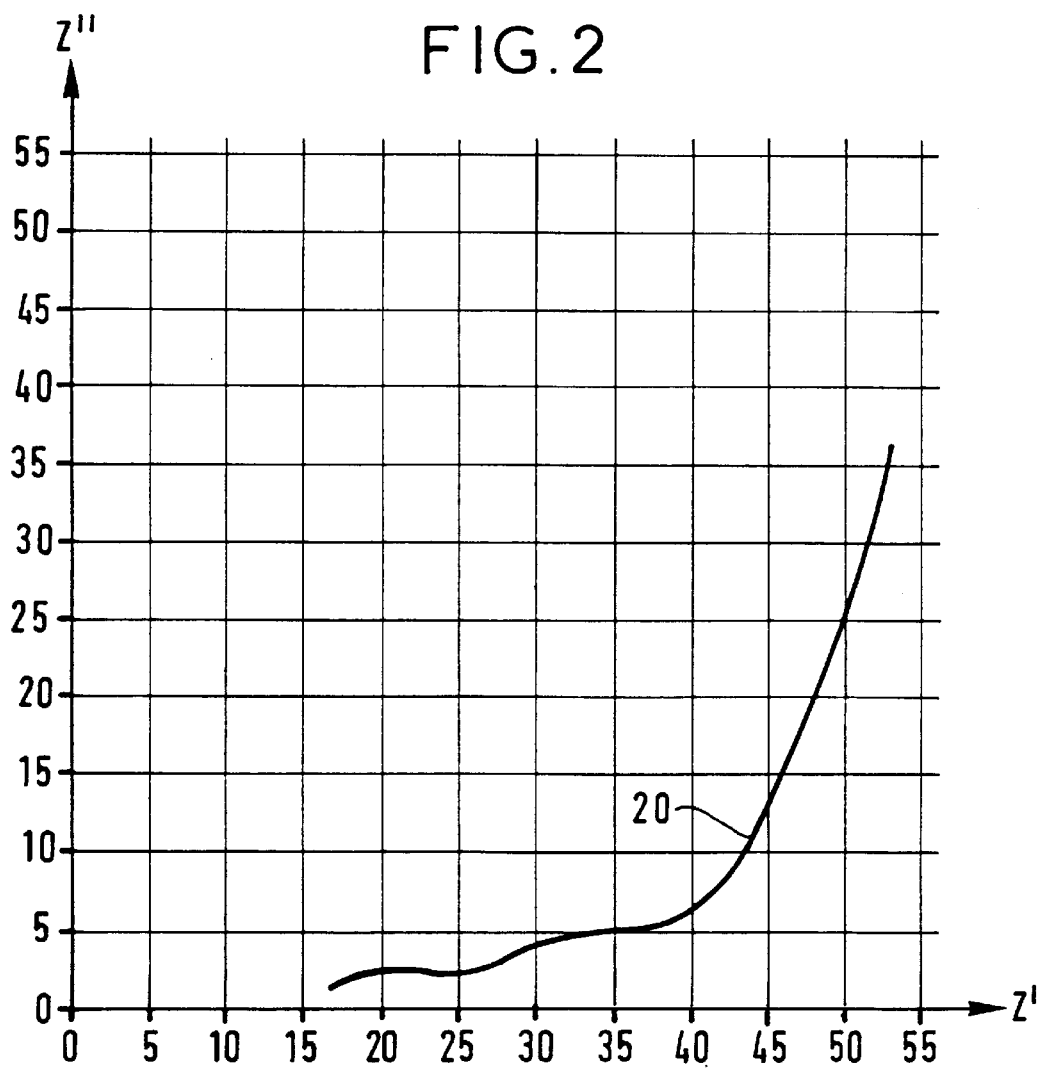
FIG. 2 shows the impedance spectrum of the cell of the invention, with the imaginary portion Z" being plotted up the ordinate in ohms and with the real portion Z' being plotted along the abscissa in ohms.

The impedance spectrum 20 of the cell was plotted over the range 0.1 Hz to 65,000 Hz as shown in FIG. 2 for an electrode area of 1.13 cm$^2$. It can be seen that polarization resistance was low, of the order of 50 $\Omega$/cm$^2$.

Figure 3:
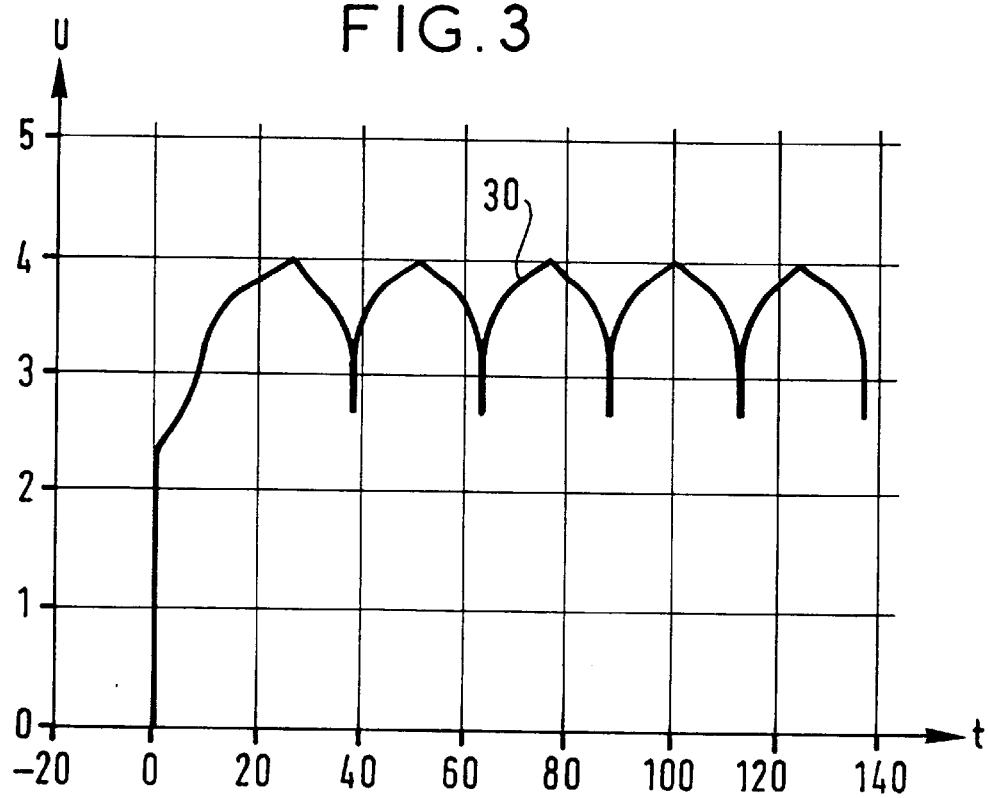
FIG. 3 shows how the voltage of the cell of the invention varies during cycling, the voltage U of the cell being plotted up the ordinate in volts, and time t being plotted along the abscissa in hours.
Figure 4:
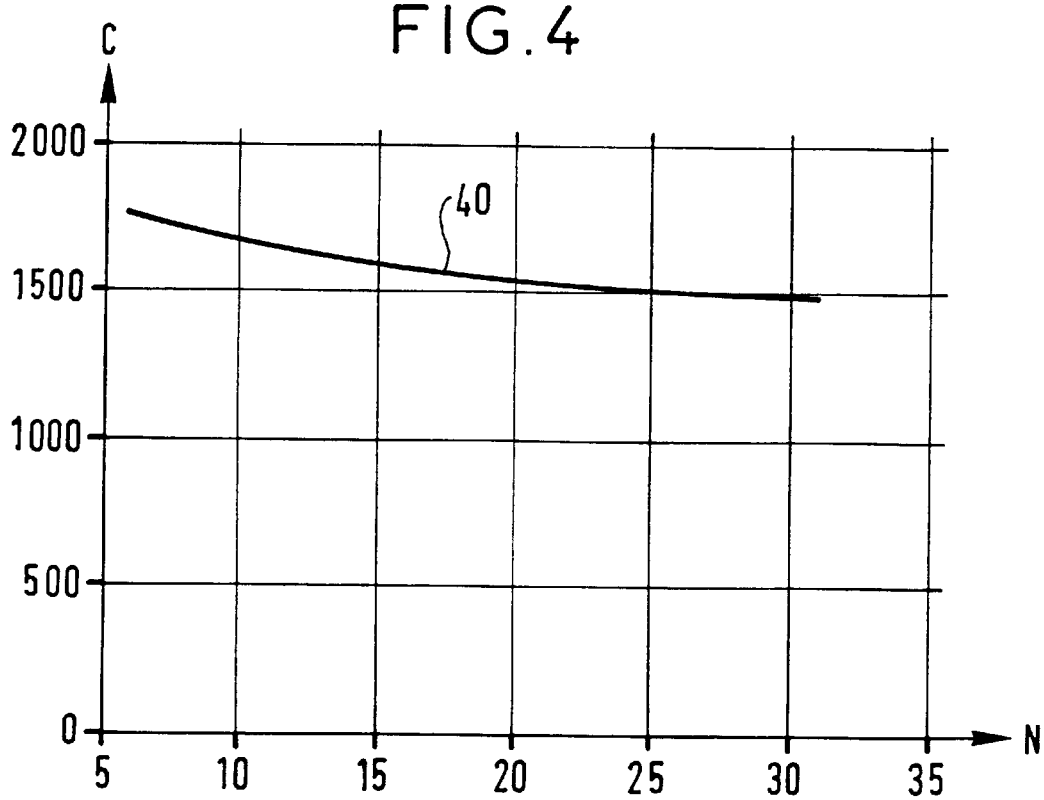
FIG. 4 shows how the capacity of a cell of the invention varies during cycling, with the capacity C of the cell being plotted up the ordinate in $\mu$Ah, and with the number of cycles N being plotted along the abscissa.

The cell 10 was cycled at a rate of Ic/20 where Ic corresponds to the rate that enables the cell to be discharged in one hour. Curve 30 in FIG. 3 and curve 40 in FIG. 4 show respectively how the voltage and the capacity of the cell varied during said cycling.

EXAMPLE 2

A button type lithium rechargeable electrochemical cell B was made in accordance with the invention having electrodes analogous to those of Example 1 and containing the same electrolyte, however it was made in a different manner.

After being fabricated, the electrodes were dried under a vacuum at 120° C. and then covered in respective films of solution containing 15% by weight PVDF, 60% by weight triethylphosphate (TEP) as volatile solvent, and 25% by weight tetrahydrofuran (THF).

After the THF had been evaporated off, the film was immersed in a non-solvent which was water, thereby causing the polymer to precipitate. A porous PVDF membrane was thus obtained which was dried in air.

The electrodes had their faces covered in the polymer film placed together and they were maintained under pressure at a temperature of 95° C. for 10 seconds. The assembly obtained in that way was placed in a cup closed by a cover to form the button type cell B.

EXAMPLE 3

A button type lithium rechargeable electrochemical cell C was made in accordance with the invention, having electrodes analogous to those of Example 1 and containing the same electrolyte, but it was made in a different manner.

After being fabricated, the electrodes were dried under a vacuum at 120° C. and then covered in respective films of a solution containing 25% by weight PVDF and 87.5% TEP.

After being allowed to drip dry, each electrode was immersed for 20 minutes in water which is a strong non-solvent in order to cause the polymer to precipitate.

The electrode was then dried in air, initially at 35° C. and then at 120° C. to remove all traces of water. This produced a very adhesive layer of solid PVDF having a thickness of 50 $\mu$m and porosity of 75%.

The faces of the electrodes carrying the polymer film were put together and the electrodes were held together under pressure at a temperature of 95° C. for 10 seconds. The resulting assembly was placed in a cup closed by a cover to form button type cell C.

EXAMPLE 4

A button type lithium rechargeable electrochemical cell D was made in accordance with the invention having electrodes analogous to those of Example 1 and containing the same electrolyte, but made in a different manner.

After being fabricated, the electrodes were dried under a vacuum at 120° C. and then covered in respective films of a solution comprising 9.1% by weight PVDP, 54.5% NMP, and 36.4% ethanol.

After being allowed to drip dry, each electrode was immersed in water at 80° C., and subsequently dried in air at 35° C. A layer of solid PVDF having 25% porosity was obtained.

The faces of the electrodes carrying the polymer films were put together and the electrodes were held together under pressure at a temperature of 95° C. for 10 seconds. The assembly obtained in this way was placed in a cup closed by a cover to form button type cell D.

Naturally, the present invention is not limited to button format cells, and any type of cell having plane electrodes can be envisaged. In addition, because of the flexibility of the electrode-separator assembly, the invention can also be applied to spiral-wound type cells. It can be used for making electrodes having any known electrochemically active electrode material and any of the usual polymer binders.

What is claimed is:

1. A method of manufacturing an inseparable electrode couple, the method comprising the following steps:
   (A)
   (1) putting a polymer into solution in a solvent;
   (2) spreading said solution in the form of a film on an inert support;
   (3) immersing the film in a volatile non-solvent that is miscible with the solvent of step (A)(1) in order to precipitate said polymer;
   (4) drying the polymer film to eliminate said non-solvent;
   (B) impregnating the polymer film and electrodes with an organic electrolyte,
   (C) forming a couple by placing the impregnated polymer film between the impregnated electrodes and in contact therewith,
   wherein the electrodes and the polymer film are impregnated before forming the couple;
   (D) pressing the couple, while heating to a temperature less than or equal to the temperature at which said polymer film starts to melt so as to obtain incomplete melting of said polymer;
   (E) cooling the pressed and heated couple of step (D) whereby the electrodes are inseparable.

2. A method according to claim 1, in which pressing is at a pressure in the range 9.18 N/cm$^2$ to 98.1 N/cm$^2$.

3. A method according to claim 1, in which said polymer film has pores of average size in the range 0.1 $\mu$m to 1 $\mu$m.

4. A method according to claim 1, in which said polymer film has a pore volume representing 30% to 95% of the volume of said film.

5. A method according to claim 1, further comprising providing an anode electrochemically active material that is a carbon-containing material suitable for inserting lithium in its structure, wherein the material is graphite, coke, vitreous carbon, carbon black, or active carbon,
   and wherein the polymer is polyvinylidene fluoride.

6. A method according to claim 1, comprising providing a cathode electrochemically active material that is vanadium oxide, a lithium-containing oxide of manganese, nickel or cobalt, or mixtures thereof,
   and wherein the polymer is polyvinylidene fluoride.

7. A method according to claim 1, in which each of said electrodes is used as a support.

8. A method according to claim 7, in which each of said electrodes including said polymer film is impregnated with said electrolyte, after which said electrodes are put together to form said couple in such a manner that said films are in contact.

9. A method according to claim 1, comprising providing an anode electrochemically active material that is graphite, providing a cathode electrochemically active material that is a mixed oxide of nickel and lithium, providing a polyvinylidene fluoride binder, and providing a polyvinylidene fluoride polymer film.

10. A method according to claim 1, in which polymer solution further contains a wetting agent at a concentration of lees than 10% by weight of said polymer.

11. A method according to claim 1, in which said polymer solution further includes a quantity of a non-solvent in an amount insufficient to cause the polymer to be precipitated.

12. A method according to claim 1, in which said polymer solution contains at least 50% by weight of said solvent.

13. A method according to claim 1, in which said polymer is selected from the group consisting of: polyvinylidene fluoride; polyvinyl chloride; polymethylmethacrylate; cellulose acetate; a polysulfone; a polyether; a polyolefin, a mixture of polyvinylidene fluoride with a polymer selected from a polysulfone, polymethylmethacrylate, polyvinylpyrolidone, a copolymer of vinylidene fluoride and ethane tetrafluoride, and a copolymer of vinylacetate and of vinylalcohol.

14. A method according to claim 1, in which said solvent is selected from the group consisting of: cyclohexanone; dichloromethane; dimethylacetamide; dimethylformamide; hexamethylphosphoramide, dimethylsulfoxide; triethylphosphate; N-methylpyrolidone; or mixtures thereof.

15. A method according to claim 1, in which said non-solvent is selected from the group consisting of: water, ethanol, ethylene-glycol, glycerol, acetone, proplyene carbonate, dichloro-methane, ethyl acetate, butanol, pentanol, acetonitrile, and mixtures thereof.

16. A method according to claim 1, in which said electrolyte contains an organic solvent comprising a mixture of
   (1) ethers and/or
   (2) esters, wherein the esters are selected from the group consisting of linear carbonates and cyclic carbonates having more than 4 carbon atoms.

17. A method according to claim 1, in which said electrolyte includes a lithium salt selected from the group consisting of: lithium perchlorate, lithium hexafluoroarsenate, lithium hexafluorophosphate, lithium tetrafluoroborate, lithium trifluoromethanesulfonate, lithium trifluoromethane-sulfonimide, lithium trifluoromethanesulfonmethide, or mixtures thereof.

18. A method according to claim 1, in which heating is performed at a temperature lying in the range 90° C. to 100° C.

19. A method of manufacturing an inseparable electrode couple, the method comprising the following steps:
   (A)
   (1) putting a polymer into solution in a solvent;
   (2) spreading said solution in the form of a film on an inert support;
   (3) immersing said film in a volatile non-solvent that is miscible with the solvent of step (A)(1) in order to precipitate said polymer;
   (4) drying the polymer film to eliminate said non-solvent;
   (B) forming a couple by placing the polymer film between two electrodes and in contact therewith;
   (C) impregnating the polymer film and the two electrodes with an organic electrolyte after the couple-forming step (B);
   (D) pressing the couple while heating to a temperature less than or equal to the temperature at which said polymer film starts to melt so as to obtain incomplete melting of said polymer;
   (E) cooling the pressed and heated couple of step (D) whereby the electrodes are inseparable.

20. A method of manufacturing an inseparable electrode couple, the method comprising the following steps:
   (A)
   (1) putting a polymer into solution in a solvent;
   (2) spreading said solution in the form of a film on one of two electrodes;
   (3) immersing said film in a volatile non-solvent that is miscible with the solvent of step (A)(1) in order to precipitate said polymer;

(4) drying the polymer film to eliminate said non-solvent;

(B) impregnating the electrode covered with the polymer film and another of said two electrodes with an organic electrolyte, (C) forming a couple by placing the impregnated electrode covered with the polymer film and the impregnated other electrode face to face, the polymer film being between the two electrodes and in contact therewith, wherein the electrodes and the polymer film are impregnated before forming the couple;

(D) pressing the couple while heating to a temperature less than or equal to the temperature at which said polymer film starts to melt so as to obtain incomplete melting of said polymer, (E) cooling the pressed and heated couple of step (D) whereby the electrodes are inseparable.

21. A method according to claim 20, in which said electrode including said polymer film is impregnated with said electrolyte, and then said electrode is covered on the same side as said film with the other of said electrodes impregnated with said electrolyte to form said couple.

22. A method of manufacturing an inseparable electrode couple, the method comprising the following steps:

(A)
  (1) putting a polymer into solution in a solvent;
  (2) spreading said solution in the form of a film on one of two electrodes;
  (3) immersing said film in a volatile non-solvent that is miscible with the solvent of step (A)(1) in order to precipitate said polymer;
  (4) drying the polymer film to eliminate said non-solvent;

(B) forming a couple by placing the electrode covered with the polymer film and the other of said two electrodes face to face, the polymer film being between the two electrodes, and in contact therewith;

(C) impregnating the polymer film and electrodes with an organic electrolyte after forming the couple in step (B);

(D) pressing the couple while heating to a temperature less than or equal to the temperature at which said polymer film starts to melt so as to obtain incomplete melting of said polymer, (E) cooling the pressed and heated couple of step (D) whereby the electrodes are inseparable.

23. A method according to claim 22, in which before covering the electrode with the film, the surface of said electrod porous layer is impregnated with a wetting agent.

24. A method of manufacturing an inseparable electrode couple, the method comprising the following steps:

(A) forming a couple by placing a dried polymer film between two electrodes and in contact therewith, (B) impregnating the polymer film and two electrodes with an organic electrolyte, (C) pressing the couple, while heating to a temperature less than or equal to the temperature at which said polymer film starts to melt so as to obtain incomplete melting of said polymer, (D) cooling the pressed and heated couple whereby the electrodes are inseparable.

25. A method of manufacturing an inseparable electrode couple, the method comprising the following steps:

(A) impregnating a dried polymer film with an organic electrolyte, (B) forming a couple by placing the electrolyte-impregnated dried polymer film between two electrodes and in contact therewith, (C) pressing the couple, while heating to a temperature less than or equal to the temperature at which said polymer film starts to melt so as to obtain incomplete melting of said polymer, (D) cooling the pressed and heated couple whereby the electrodes are inseparable.

* * * * *